United States Patent [19]

Sekar et al.

[11] Patent Number: 5,526,641
[45] Date of Patent: Jun. 18, 1996

[54] NO_x REDUCTION METHOD

[75] Inventors: Ramanujam R. Sekar, Naperville, Ill.; Lyle O. Hoppie, West Bloomfield, Mich.

[73] Assignee: The University of Chicago, Chicago, Ill.

[21] Appl. No.: 19,102

[22] Filed: Feb. 18, 1993

[51] Int. Cl.$^6$ .............................. F01N 3/08; B01D 53/56; B01D 53/92

[52] U.S. Cl. .............................. 60/274; 60/282; 423/212; 423/235; 123/585

[58] Field of Search .................................. 423/212, 235; 55/16, 158; 60/274, 282; 123/585

[56] References Cited

U.S. PATENT DOCUMENTS 5,051,113 9/1991 Nemser .......................................... 55/16
5,051,114 9/1991 Nemser et al. .

FOREIGN PATENT DOCUMENTS 3409859 9/1985 Germany ................................ 423/235

OTHER PUBLICATIONS

Hilliard, J. C. and F. J. Weinberg, "Effect of nitrogen—containing plasmas on stability, NO formation and sooting of flames", *Nature*, vol. 259, pp. 556–557, Feb. 19, 1976.

*Primary Examiner*—Leonard Heyman
*Attorney, Agent, or Firm*—Mason, Kolehmainen, Rathburn & Wyss

[57] ABSTRACT

A method of reducing oxides of nitrogen (NO$_x$) in the exhaust of an internal combustion engine includes producing oxygen enriched air and nitrogen-enriched air by an oxygen enrichment device. The oxygen enriched air may be provided to the intake of the internal combustion engine for mixing with fuel. In order to reduce the amount of NO$_x$ in the exhaust of the internal combustion engine, the molecular nitrogen in the nitrogen enriched air produced by the oxygen enrichment device is subjected to a corona or arc discharge so as to create a plasma and as a result, atomic nitrogen. The resulting atomic nitrogen then is injected into the exhaust of the internal combustion engine causing the oxides of nitrogen in the exhaust to be reduced into nitrogen and oxygen. In one embodiment of the present invention, the oxygen enrichment device that produces both the oxygen and nitrogen enriched air can include a selectively permeable membrane.

10 Claims, 1 Drawing Sheet

$NO_x$ REDUCTION METHOD

CONTRACTUAL ORIGIN OF THE INVENTION

The United States Government has rights in this invention pursuant to Contract No. W-31-109-ENG-38 between the United States Government and Argonne National Laboratory.

BACKGROUND OF THE INVENTION

1. Field of the Invention

This invention relates to a method and apparatus for reducing oxides of nitrogen in the exhaust emissions of an internal combustion engine, and more particularly, to a new and improved method and apparatus for injecting atomic nitrogen into the exhaust of an internal combustion engine so that oxides of nitrogen in the exhaust are reduced to nitrogen and oxide.

2. Background of the Invention

If oxygen enriched air is used as part of the intake of an internal combustion engine, the engine's power density tends to be increased and the particulate emissions from the engine tend to be reduced. On the other hand, the use of such oxygen enriched air tends to increase the amount of oxides of nitrogen ($NO_x$) that are present in the engine's exhaust. This increase in the amount of $NO_x$ in the engine's exhaust has concerned developers and manufacturers of internal combustion engines because legal regulations dealing with emissions from an internal combustion engine include specifications limiting the amount of $NO_x$ that may be present in such emissions. Consequently, the developers and manufacturers of internal combustion engines would like to obtain the advantages of using oxygen enriched air in the intake of an internal combustion engine, but at the same time would like to reduce the amount of $NO_x$ that is present in the engine's emissions.

One way of reducing $NO_x$ in any stream of gas is to inject atomic nitrogen into the stream of gas. For example, an article entitled "Effect of nitrogen-containing plasmas on stability, NO formation and sooting of flames" by J. C. Hilliard and F. J. Weinberg appearing in *Nature*, Vol. 259, page 556 (Feb. 19, 1976) indicates that nitrogen atoms from a plasma can be injected into a fast flowing stream of nitric oxide in argon and synthetic exhaust gas mixes. The article further states (page 557) that "[r]eductions in nitric oxide from 3,000 p.p.m. to a residual 80 p.p.m. were readily obtained in flows up to 250 1 $min^{-1}$." A problem associated with the injecting of atomic nitrogen in the exhaust of an automobile engine is obtaining the atomic nitrogen to inject into the exhaust. One of the most common sources of atomic nitrogen is ammonia ($NH_3$), but at the present time, it is not practical to store in an automobile that source of atomic nitrogen.

Accordingly, it is an object of the present invention to provide a new and improved method and apparatus for reducing $NO_x$ emissions in the exhaust of an internal combustion engine.

It is another object of the present invention to provide a new and improved method and apparatus for injecting atomic nitrogen into the exhaust of an internal combustion engine to thereby cause oxides of nitrogen present in that exhaust to be reduced to nitrogen and oxygen.

It is yet another object of the present invention to provide a new and improved method and apparatus for reducing the amount of $NO_x$ in the emissions from an internal combustion engine by injecting atomic nitrogen into the exhaust of an internal combustion engine which atomic nitrogen is formed by subjecting to a corona or arc discharge nitrogen enriched air produced by a selectively permeable membrane.

SUMMARY OF THE INVENTION

In accordance with these and many other objects of the present invention, a $NO_x$ control system for an internal combustion engine embodying the present invention includes an oxygen enrichment device that produces oxygen enriched air and nitrogen enriched air. The oxygen enriched air may be provided to the intake of the internal combustion engine for combustion of the fuel. In order to reduce the amount of $NO_x$ in the exhaust of the internal combustion engine, the molecular nitrogen in the nitrogen enriched air produced by the oxygen enrichment device is subjected to a corona or arc discharge so as to create a plasma and as a result, atomic nitrogen. The resulting atomic nitrogen then is injected into the exhaust of the internal combustion engine. The injection of the atomic nitrogen into the exhaust of the internal combustion engine causes the oxides of nitrogen to be reduced into nitrogen and oxygen such that the emissions from the engine will have acceptable levels of $NO_x$. In one embodiment of the present invention, the oxygen enrichment device that produces both the oxygen and nitrogen enriched air can include a selectively permeable membrane as for example disclosed in U.S. Pat. No. 5,051,114 issued on Sep. 24, 1991.

BRIEF DESCRIPTION OF THE DRAWINGS

These and many other objects and advantages of the present invention will become readily apparent from consideration of the following detailed description of the embodiment of the invention shown in the accompanying drawing Wherein.

DETAILED DESCRIPTION OF THE PREFERRED EMBODIMENT

Figure 1:
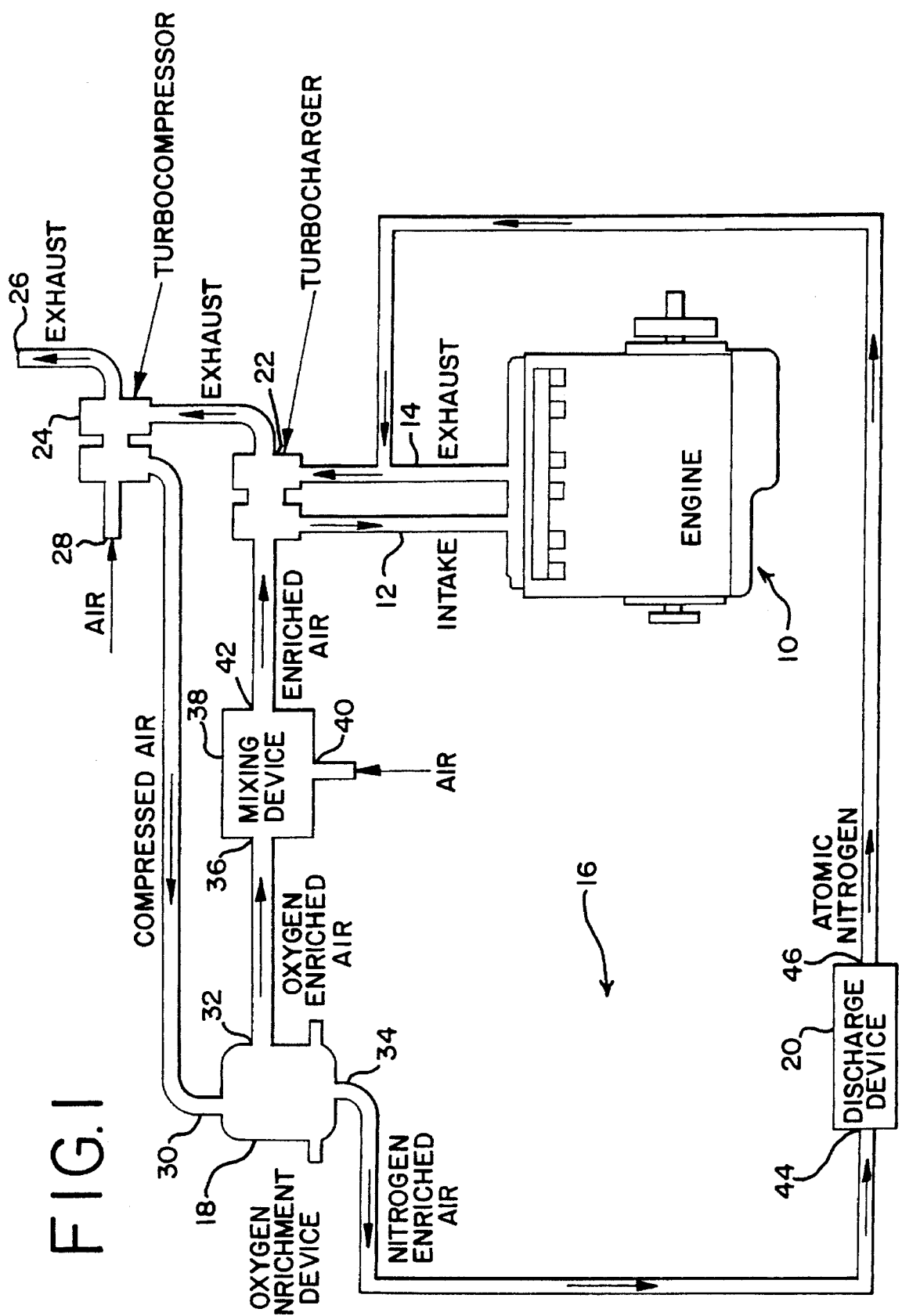
FIG. 1 is a diagrammatic illustration of an internal combustion engine having a $NO_x$ control system embodying the present invention.

Referring now more specifically to the single figure of the drawing (FIG. 1), therein is disclosed a diagrammatic representation of an internal combustion engine 10 having an intake line 12 for receiving air that is combined with fuel in the engine 10 and an exhaust line 14 through which is expelled the exhaust gases produced in the engine 10. The exhaust gases contain pollutants including oxides of nitrogen ($NO_x$). In order to control the amount of $NO_x$ that is present in the exhaust gases expelled from the engine 10 through the exhaust line 14, the engine 10 is provided with a $NO_x$ control system that is generally designated by the reference numeral 16 and that embodies the present invention. The $NO_x$ control system 16 includes an oxygen enrichment device 18 that produces oxygen enriched air and nitrogen enriched air. The oxygen enriched air is used as at least a portion of the air that is supplied to the intake line 12 of the engine 10. The nitrogen enriched air is supplied to a discharge device 20 so that the molecular nitrogen in the nitrogen enriched air can be converted to atomic nitrogen. The atomic nitrogen is injected into the exhaust gases being expelled from the engine 10 through the exhaust line 14 causing the $NO_x$ in those exhaust gases to be reduced to nitrogen and oxygen. As a result, the levels of $NO_x$ in the exhaust gases expelled from the engine 10 will be at an acceptable level.

The engine 10 may be any type of internal combustion engine in which air supplied through the intake line 12 is combined with a combustible fuel. One example of such an engine 10 is a diesel engine. As is the case with all such internal combustion engines, exhaust gases are produced that are expelled through the exhaust line 14.

The exhaust gases flowing through the exhaust line 14 pass through a turbocharger 22 and an optional turbocompressor 24 to an exhaust outlet 26 from which the exhaust gases are discharged into the atmosphere. The movement of the exhaust gases through the turbocompressor 24 drives a pump within the turbocompressor 24 so that air drawn into an air inlet 28 is compressed and supplied under pressure to an inlet 30 of the oxygen enrichment device 18. The oxygen enrichment device 18 is adapted to separate the oxygen and nitrogen present in the air being supplied from the turbocompressor 24 so as to produce oxygen enriched air at an outlet 32 and nitrogen enriched air at another outlet 34. The oxygen enrichment device 18 can be of the type having a selectively permeable membrane that can separate or enrich gaseous mixtures. A membrane of this type is disclosed in U. S. Pat. No. 5,051,114 issued on Sep. 24, 1991. As indicated in that patent, the membrane disclosed in that patent can be used to produce oxygen enriched air by separating oxygen and nitrogen present in the air.

The oxygen enriched air flowing from the outlet 32 is supplied to an inlet 36 of an air mixing device 38. The air mixing device 38 blends the oxygen enriched air supplied to the inlet 36 with air drawn into another inlet 40 so that air that is enriched with a certain amount of oxygen is supplied from an outlet 42 to the turbocharger 22. The turbocharger 22 is driven by the flow of exhaust gases through the exhaust line 14 of the engine 10 and enables a greater amount of air being supplied from the air mixing device 38 to be injected into the engine 10 through the air intake line 12.

As previously indicated, the oxygen enrichment device 18 separates oxygen from the air supplied to its inlet 30 resulting in oxygen enriched air being supplied to its outlet 32. Consequently, the air being expelled from the other outlet 34 of the oxygen enrichment device 18 is nitrogen enriched air. Depending on the membrane used in the oxygen enrichment device 18, the air being expelled from the outlet 34 of the oxygen enrichment device 18 may contain as much as 99% molecular nitrogen.

The nitrogen enriched air being expelled from the outlet 34 is supplied to an inlet 44 of the discharge device 20. The discharge device 20 converts into atomic nitrogen the molecular nitrogen present in the air expelled from the outlet 34. In order to accomplish this conversion, the discharge device 20 includes one or more arc creating devices so that a corona or arc discharge is produced to create a plasma within the discharge device 20. One type of such arc creating device is a spark plug and more than one spark plug (for example, four spark plugs) can be used to generate a sufficient arc that results in a plasma being produced such that the molecular nitrogen will be transformed into atomic nitrogen. Alternatively, a corona charge along the elongated axis of a cylindrical wire placed in the middle of a round tube can be used. The wire in the center of the tube is either positively or negatively charged while the tube is oppositely charged to create a corona charge. This corona charge along the wire will distribute the moatomic nitrogen over a larger space than a spark.

The atomic nitrogen formed in the discharge device 20 is supplied from an outlet 46 of the discharge device 20 to the exhaust line 14 extending from the engine 10 and is injected into the exhaust gas stream that is being expelled from the engine 10 through the exhaust line 14. As indicated above, the injection of atomic nitrogen into a stream of gases containing $NO_x$ will result in the reduction of the $NO_x$ to nitrogen and oxygen. Consequently, the injection of the atomic nitrogen being supplied from the outlet 46 of the discharge device 20 to the exhaust line 14 will decrease the amount of $NO_x$ in the exhaust gases flowing in the exhaust line 14 due to the reduction of such $NO_x$ to nitrogen and oxygen. As a result, the amount of $NO_x$ in the exhaust gases being expelled from the exhaust outlet 26 into the atmosphere will tend to be at acceptable levels.

Obviously, many modifications and variations of the present invention are possible in light of the above teachings. In this regard, the engine 10 described in connection with the above preferred embodiment has a turbocharger 22 for forcing a greater amount of air into the engine 10 through the intake line 12 and a turbocompressor 24 for Supplying a greater quantity of air to the oxygen enrichment device 18. On the other hand, the $NO_x$ control system 16 can be used with an engine that does not include any such turbocharger 22 or turbocompressor 24. If the turbocompressor 24 is not utilized, the oxygen enrichment device 18 may have to be increased in size in order to provide the necessary amount of nitrogen enriched air to the inlet 44 of the discharge device 20. The $NO_x$ control system 16 also can be used to reduce the level of $NO_x$ in the exhaust of the engine 10 even though the air that is supplied to the engine 10 through the intake line 12 is not oxygen enriched air. All that is necessary is for nitrogen enriched air to be supplied to a discharge device, like the discharge device 20, in order that molecular nitrogen is transformed into atomic nitrogen which is in turn injected into the exhaust gases being emitted from the engine 10. In this regard, FIG. 1 is merely a diagrammatic representation of the $NO_x$ control system 16. In the actual construction of such a $NO_x$ control system 16, it is preferable that the discharge device 20 be located in as close proximity as possible to the exhaust line 14 or possibly in the exhaust line 14 because atomic nitrogen tends to be somewhat unstable and should be combined with the exhaust gases in the exhaust line 14 as soon as possible after being formed. Thus, it is to be understood that, within the scope of the appended claims, the invention may be practiced otherwise than as specifically described above.

What is claimed and desired to be secured by Letters Patent of the United States is:

1. A $NO_x$ control system for an internal combustion engine that emits exhaust gases containing oxides of nitrogen through an exhaust line, said $NO_x$ control system comprising:

enrichment means for producing from air nitrogen enriched air having molecular nitrogen;

discharge means connected to said enrichment means for receiving said nitrogen enriched air from said enrichment means and reducing said molecular nitrogen to atomic nitrogen; and supply means for connecting said discharge means to said exhaust line so that said atomic nitrogen can be supplied to said exhaust line in order that oxides of nitrogen within said exhaust gases are formed into nitrogen and oxygen.

2. A $NO_x$ control system as set forth in claim 1 wherein said enrichment means includes a selectively permeable membrane for separating oxygen from air.

3. A $NO_x$ control system as set forth in claim 1 wherein said discharge means includes a spark generating means for producing an arc so as to form a plasma thereby causing said molecular nitrogen to be reduced to atomic nitrogen.

4. A $NO_x$ control system as set forth in claim 3 wherein said spark generating means is at least one spark plug.

5. A $NO_x$ control system as set forth in claim 1 wherein said engine includes a turbocompressor associated with said exhaust line, said turbo compressor supplying compressed air to said enrichment means.

6. A $NO_x$ control system as set forth in claim 1 wherein said enrichment means also produces oxygen enriched air and said engine includes a mixing means for mixing said oxygen enriched air produced by said enrichment means with air so that said oxygen enriched air can be supplied to an intake of said engine.

7. A $NO_x$ control system as set forth in claim 1 wherein said engine includes a turbocharger associated with said exhaust line that supplies air under pressure to an intake of said engine.

8. A method of reducing the amount of oxides of nitrogen present in the exhaust gases being emitted from an internal combustion engine through an exhaust line, said method comprising:

producing nitrogen enriched air having molecular nitrogen by separating oxygen from air with a selectively permeable membrane;

supplying said nitrogen enriched air to a discharge means;

reducing in said discharge means said molecular nitrogen in said nitrogen enriched air to atomic nitrogen; and supplying said atomic nitrogen to said exhaust line in order that oxides of nitrogen within said exhaust gases are formed into nitrogen and oxygen.

9. A method as set forth in claim 8 wherein said reducing of said molecular nitrogen in said nitrogen enriched air is accomplished by producing a plasma within said discharge means so as produce to said atomic nitrogen.

10. A method as set forth in claim 8 wherein said reducing of said molecular nitrogen in said nitrogen enriched air is accomplished by producing an arc discharge in at least one spark plug within said discharge means.

* * * * *